(12) United States Patent
Donovan et al.

(10) Patent No.: US 10,009,730 B2
(45) Date of Patent: Jun. 26, 2018

(54) PRELOADING DATA

(71) Applicant: Telefonaktiebolaget LM Ericsson (publ), Stockholm (SE)

(72) Inventors: Craig Donovan, Stockholm (SE); Joerg Niemoeller, Sundbyberg (SE); Konstantinos Vandikas, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 13 days.

(21) Appl. No.: 15/113,657

(22) PCT Filed: Jan. 30, 2014

(86) PCT No.: PCT/SE2014/050119
§ 371 (c)(1),
(2) Date: Jul. 22, 2016

(87) PCT Pub. No.: WO2015/115947
PCT Pub. Date: Aug. 6, 2015

(65) Prior Publication Data
US 2017/0006431 A1   Jan. 5, 2017

(51) Int. Cl.
*H04W 24/00* (2009.01)
*H04W 4/02* (2018.01)
(Continued)

(52) U.S. Cl.
CPC ......... *H04W 4/028* (2013.01); *H04L 65/1083* (2013.01); *H04L 65/4092* (2013.01);
(Continued)

(58) Field of Classification Search
CPC ....... H04W 36/00; H04W 36/02; H04W 4/02; H04W 24/02; H04W 24/04; H04W 28/02;
(Continued)

(56) References Cited

U.S. PATENT DOCUMENTS 6,456,234 B1   9/2002   Johnson
7,187,997 B2   3/2007   Johnson
(Continued)

FOREIGN PATENT DOCUMENTS

| EP | 1677559 A1 | 7/2006 |
|---|---|---|
| EP | 2555569 A1 | 2/2013 |
| KR | 1126800 B1 | 3/2012 |

OTHER PUBLICATIONS

Singh, V., et al., "Predictive Buffering for Streaming Video in 3G Networks", World of Wireless, Mobile and Multimedia Networks (WoWMoM), 2012 IEEE International Symposium on a, vol. No. Jun. 25-28, 2012, 10 pages.
(Continued)

Primary Examiner — Temica M Beamer
(74) Attorney, Agent, or Firm — Rothwell, Figg, Ernst & Manbeck, p.c.

(57) ABSTRACT

It is presented a method for providing data to a wireless device in a cellular communication network comprising a plurality of radio cells. The method is performed in a data provider device and comprises the steps of: predicting a set of potential future locations of the wireless device; predicting future data transfer capacity at the set of potential future locations; and preloading data to the wireless device at a first time when an expected transfer capacity is greater than a desired data transfer capacity, and when a data transfer capacity at a second time after the first time is predicted to be less than a desired data transfer capacity.

22 Claims, 4 Drawing Sheets

(51) Int. Cl.
*H04L 29/08* (2006.01)
*H04L 29/06* (2006.01)
*H04W 8/22* (2009.01)
*H04W 28/26* (2009.01)
*H04W 4/029* (2018.01)
*H04W 4/70* (2018.01)

(52) U.S. Cl.
CPC ......... *H04L 67/2847* (2013.01); *H04W 4/029* (2018.02); *H04W 8/22* (2013.01); *H04W 28/26* (2013.01); *H04W 4/70* (2018.02)

(58) Field of Classification Search
CPC ........... H04W 28/021; H04W 28/0215; H04W 28/0226; H04W 28/0289; H04W 64/003; H04W 64/006; H04W 64/00
USPC .......... 455/456.1, 436, 440, 441, 450, 452.1
See application file for complete search history.

(56) References Cited

U.S. PATENT DOCUMENTS

| | | |
|---|---|---|
| 2007/0005188 A1 | 1/2007 | Johnson |
| 2010/0075639 A1 | 3/2010 | Horvitz et al. |
| 2012/0054180 A1 | 3/2012 | Priyadarshan et al. |
| 2012/0054302 A1 | 3/2012 | Priyadarshan et al. |
| 2012/0064908 A1* | 3/2012 | Fox ...................... H04W 28/10 455/452.2 |
| 2012/0137320 A1 | 5/2012 | Mugulavalli et al. |
| 2013/0125031 A1 | 5/2013 | Calica et al. |
| 2015/0092676 A1* | 4/2015 | Periyalwar .......... H04W 76/025 370/329 |

OTHER PUBLICATIONS

Siris, V.A., et al. "Performance and Energy Efficiency of Mobile Data Offloading with Mobility Prediction and Prefetching", World of Wireless, Mobile and Multimedia Networks (WoWMoM), 2013 IEEE 14th International Symposium and Workshops on a, vol. No. Jun. 4-7, 2013, 6 pages.

International Search Report and Written Opinion dated Sep. 17, 2014 in International application No. PCT/SE2014/050119, 13 pages.

* cited by examiner

PRELOADING DATA

CROSS-REFERENCE TO RELATED APPLICATION(S)

This application is a 35 U.S.C. § 371 National Phase Entry Application from PCT/SE2014/050119, filed Jan. 30, 2014, and designating the United States.

TECHNICAL FIELD

The invention relates to providing data to a wireless device, and more specifically conditionally preloading data to the wireless device.

BACKGROUND

Cellular communication networks evolve towards higher data rates, improved capacity and coverage. In the 3rd Generation Partnership Project (3GPP) standardization body, several technologies have been and are also currently being developed.

LTE (Long Term Evolution) is a recent standardised technology. It uses an access technology based on OFDM (Orthogonal Frequency Division Multiplexing) for the downlink and Single Carrier FDMA (SC-FDMA) for the uplink. The resource allocation to wireless devices (also known as user equipment, UEs) on both downlink and uplink is generally performed adaptively using fast scheduling, taking into account the instantaneous traffic pattern and radio propagation characteristics of each wireless device.

LTE is one example of a fourth generation (4G) network. However, LTE is not deployed everywhere, whereby wireless devices that support LTE still connect to third generation (3G) networks, such as W-CDMA (Wideband Code Division Multiplex), and even second generation (2G) networks when there is no LTE coverage. In this way, the wireless device can still communicate even when there is not LTE coverage.

However, since capacity varies greatly over time and with movement of the wireless device, when a user is actively transferring data e.g. by streaming a video download, the data capacity can limit the user experience when capacity varies, e.g. causing freezing in the video download or even causing the video download session to disconnect.

SUMMARY

It is an object to alleviate the problems of the prior art with capacity variations.

According to a first aspect, it is presented a method for providing data to a wireless device in a cellular communication network comprising a plurality of radio cells. The method is performed in a data provider device and comprises the steps of: predicting a set of potential future locations of the wireless device; predicting future data transfer capacity at the set of potential future locations; and preloading data to the wireless device at a first time when an expected transfer capacity is greater than a desired data transfer capacity, and when a data transfer capacity at a second time after the first time is predicted to be less than a desired data transfer capacity. In other words, at the first time, there is a predicted surplus of data transfer capacity and at the second time there is a predicted shortage of data transfer capacity. Since the first time is before the second time, it then makes sense to preload data at the first time, such that e.g. content buffers don't run out before or around the second time. This significantly improves the user experience, e.g. when watching streamed video and has the capability of bridging gaps in predicted data transfer capacity.

The step of predicting future data transfer capacity may comprise determining expected data transfer capacity for each radio cell corresponding to a future location in the set of potential future locations.

The step of predicting a set of potential future locations may comprise predicting a corresponding time for each one of the future locations in the set of potential future locations; and the step of predicting future data transfer capacity may comprise determining expected data transfer capacity at the corresponding time for each radio cell corresponding to a future location in the set of potential future locations.

The method may further comprise the step of estimating available capacity at the corresponding time for each radio cell corresponding to a future location in the set of potential future locations; and the step of predicting future data transfer capacity may be based on the result of the estimating available capacity.

The step of predicting a set of potential future locations may comprise assigning a probability of future presence at each one of the future locations.

The step of preloading data may comprise preloading data only when a future data transfer capacity for a location with a probability greater than a threshold probability is predicted to be less than the desired data transfer capacity.

The method may further comprise the step of: obtaining a device capability of the wireless device; and the step of predicting future data transfer capacity may be based on the device capability.

The step of predicting a set of potential future locations may be based on location data of the wireless device.

The location data may comprise a route of a navigation application of the wireless device.

The location data may comprise a plurality of route alternatives and the method may further comprise the step of: providing a predicted capacity set for each one of the plurality of route alternatives, each predicted capacity set comprising predicted data transfer capacity at a set of potential future locations along the associated route.

The step of predicting a set of potential future locations may be based on manual input received from a user of the wireless device.

According to a second aspect, it is provided a data provider device arranged to be part of a cellular communication network comprising a plurality of radio cells. The data provider device comprises: a processor; and a memory storing instructions that, when executed by the processor, causes the data provider device to: predict a set of potential future locations of a wireless device of the cellular communication network; predict future data transfer capacity at the set of potential future locations; and preload data to the wireless device at a first time when an expected transfer capacity is greater than a desired data transfer capacity, and when a data transfer capacity at a second time after the first time is predicted to be less than a desired data transfer capacity.

The instructions to predict future data transfer capacity may comprise instructions that, when executed by the processor, causes the data provider device to determine expected data transfer capacity for each radio cell corresponding to a future location in the set of potential future locations.

The instructions to predict a set of potential future locations may comprise instructions that, when executed by the processor, causes the data provider device to predict a corresponding time for each one of the future locations in the set of potential future locations; and the instructions to predict future data transfer capacity may comprise instructions that, when executed by the processor, causes the data provider device to determine expected data transfer capacity at the corresponding time for each radio cell corresponding to a future location in the set of potential future locations.

The data provider device may further comprise instructions that, when executed by the processor, causes the data provider device to estimate available capacity at the corresponding time for each radio cell corresponding to a future location in the set of potential future locations; and the instructions to predict future data transfer capacity may comprise instructions that, when executed by the processor, causes the data provider device to predict future data transfer capacity based on the result of the estimating available capacity.

The instructions to predict a set of potential future locations may comprise instructions that, when executed by the processor, causes the data provider device to assign a probability of future presence at each one of the future locations.

The instructions to preload data may comprise instructions that, when executed by the processor, causes the data provider device to preload data only when a future data transfer capacity for a location with a probability greater than a threshold probability is predicted to be less than the desired data transfer capacity.

The data provider device may further comprise instructions that, when executed by the processor, causes the data provider device to: obtain a device capability of the wireless device; and the instructions to predict future data transfer capacity may comprise instructions that, when executed by the processor, causes the data provider device to predict future data transfer capacity based on the device capability.

The instructions to predict a set of potential future locations may comprise instructions that, when executed by the processor, causes the data provider device to predict a set of potential future locations based on location data from the wireless device.

The location data may comprise a route of a navigation application of the wireless device.

The location data may comprise a plurality of route alternatives and the data provider may further comprise instructions that, when executed by the processor, causes the data provider device to: provide a predicted capacity set for each one of the plurality of route alternatives, each predicted capacity set comprising predicted data transfer capacity at a set of potential future locations along the associated route.

The instructions to predict a set of potential future locations may comprise instructions that, when executed by the processor, causes the data provider device to predict a set of potential future locations based on manual input received from a user of the wireless device.

According to a third aspect, it is presented a data provider device. The data provider device comprises means for predicting a set of potential future locations of a wireless device in a cellular communication network comprising a plurality of radio cells; means for predicting future data transfer capacity at the set of potential future locations; and means for preloading data to the wireless device at a first time when an expected transfer capacity is greater than a desired data transfer capacity, and when a data transfer capacity at a second time after the first time is predicted to be less than a desired data transfer capacity.

The means for predicting future data transfer capacity may comprise means for determining expected data transfer capacity for each radio cell corresponding to a future location in the set of potential future locations.

The means for predicting a set of potential future locations may comprise means for predicting a corresponding time for each one of the future locations in the set of potential future locations; and the means for predicting future data transfer capacity may comprise means for determining expected data transfer capacity at the corresponding time for each radio cell corresponding to a future location in the set of potential future locations.

The data provider device may further comprise means for estimating available capacity at the corresponding time for each radio cell corresponding to a future location in the set of potential future locations; and the means for predicting future data transfer capacity may comprise means for predicting future data transfer capacity based on the result of the estimating available capacity.

The means for predicting a set of potential future locations may comprise means for assigning a probability of future presence at each one of the future locations.

The means for preloading data may comprise means for preloading data only when a future data transfer capacity for a location with a probability greater than a threshold probability is predicted to be less than the desired data transfer capacity.

The data provider device may further comprise means for obtaining a device capability of the wireless device; and the means for predicting future data transfer capacity may be comprise means for predicting future data transfer capacity based on the device capability.

The means for predicting a set of potential future locations may comprise means for predicting the set of potential future locations based on location data of the wireless device.

The location data may comprise a route of a navigation application of the wireless device.

The location data may comprise a plurality of route alternatives and the data provider device may further comprise means for providing a predicted capacity set for each one of the plurality of route alternatives, each predicted capacity set comprising predicted data transfer capacity at a set of potential future locations along the associated route.

The means for predicting a set of potential future locations may be based on manual input received from a user of the wireless device.

According to a fourth aspect, it is presented a network node comprising the data provider device according to the second or third aspect.

According to a fifth aspect, it is presented a wireless device comprising the data provider device according to the second or third aspect.

According to a sixth aspect, it is presented a computer program for providing data to a wireless device in a cellular communication network comprising a plurality of radio cells. The computer program comprises computer program code which, when run on a data provider device causes the network node to: predict a set of potential future locations of a wireless device of the cellular communication network; predict future data transfer capacity at the set of potential future locations; and preload data to the wireless device at a first time when an expected transfer capacity is greater than a desired data transfer capacity, and when a data transfer capacity at a second time after the first time is predicted to be less than a desired data transfer capacity.

According to a seventh aspect, it is presented a computer program product comprising a computer program according to the sixth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
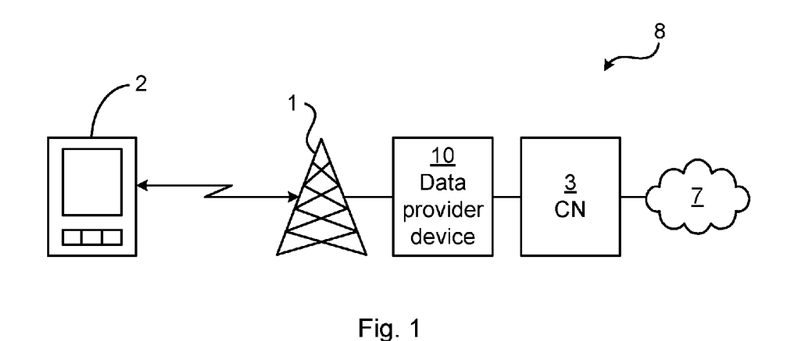
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more network nodes 1, here in the form of radio base stations being evolved Node Bs, also known as eNode Bs or eNBs. The network node 1 could also be in the form of Node Bs, BTSs (Base Transceiver Stations) and/or BSSs (Base Station Subsystems), etc. The network node 1 provides radio connectivity to a plurality of wireless devices 2 via one or more radio cells per network node 1. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

Figure 2:
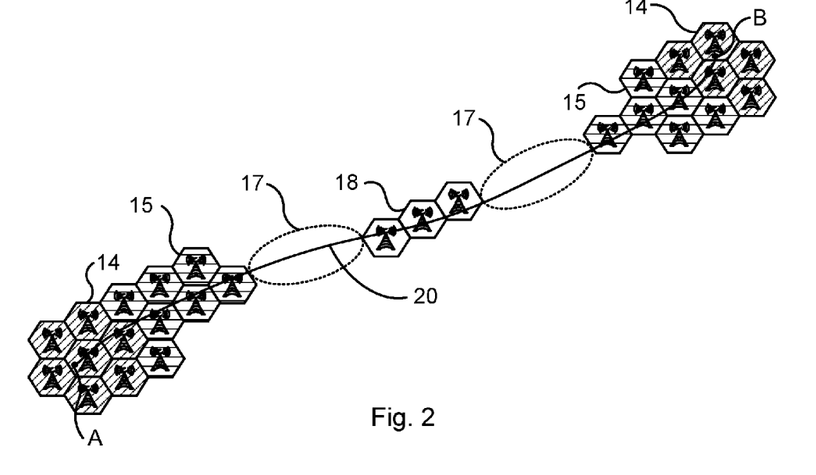
FIG. 2 is a schematic diagram illustrating movement of the wireless device of FIG. 1 along a path from A to B.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable. Many times, as shown in FIG. 2 and explained below, network of different radio access technologies are interconnected for reasons of coverage. For example, there may be LTE coverage in large cities, W-CDMA coverage in most other areas and GSM coverage in almost all remaining areas, leaving only some unpopulated areas without coverage at all.

Communication between the wireless device 2 and the network node 1 occurs over a wireless radio interface in a cell of a network node 1, where uplink (UL) communication occurs from the wireless device 2 to the network node 1 and downlink (DL) communication occurs from the network node 1 to the wireless device 2. The quality of the wireless radio interface to each wireless device 2 can vary over time and depends on the position of the wireless device 2, due to effects such as fading, interference, multipath propagation, etc.

The network node 1 is also connected to the core network 3 for connectivity to central functions and a wide area network 7, such as the Internet.

FIG. 2 is a schematic diagram illustrating movement of the wireless device of FIG. 1 along a path 20 from A to B. For example, the wireless device can be located in a moving vehicle such as a car, a bus or a train. The cellular network coverage varies as the wireless device moves, and passes through areas of different radio access technologies. The cells of FIG. 2 form a subset of a network coverage map in the proximity of the path 20. The whole network coverage map comprises capacity information for each cell in the entire network.

In this example, along the path 20 from A to B, there is first an area 14 of LTE coverage. After that, the path passes through an area 15 of W-CDMA coverage, followed by an area 17 of no coverage. Subsequently, there is an area 18 with GSM coverage, followed again by an area 17 of no coverage. Finally, the path passes through a new area of W-CDMA coverage 15 and a new area of LTE coverage 14.

It is thus apparent how coverage and maximum capacity varies from A to B.

Figure 3:
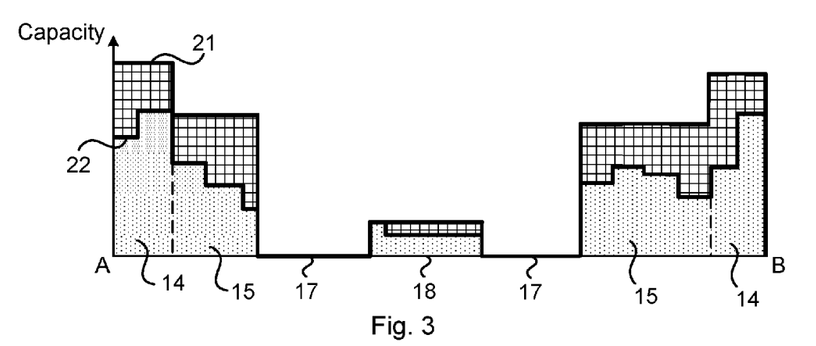
FIG. 3 is a schematic diagram illustrating capacity along the path from A to B of FIG. 2.

FIG. 3 is a schematic diagram illustrating capacity along the path from A to B of FIG. 2. A maximum capacity 21 is indicated by an upper line. An expected transfer capacity 22 is indicated by a lower line which in some cases coincides with the maximum capacity 21. The maximum capacity 21 is the maximum capacity of a particular area (or cell). The expected transfer capacity 22 is a more realistic capacity, when e.g. cell load is taken into account. Optionally, the expected transfer capacity 22 also includes consideration to expected radio conditions. The expected transfer capacity 22 can be based on historic actual transfer capacity or other parameters, e.g. stored in a network load database.

Hence, the maximum capacity 21 follows the maximum capacity for the cell type, e.g. LTE, W-CDMA, GSM and the expected transfer capacity 22 also takes other capacity limiting parameters into account.

Figure 4A:
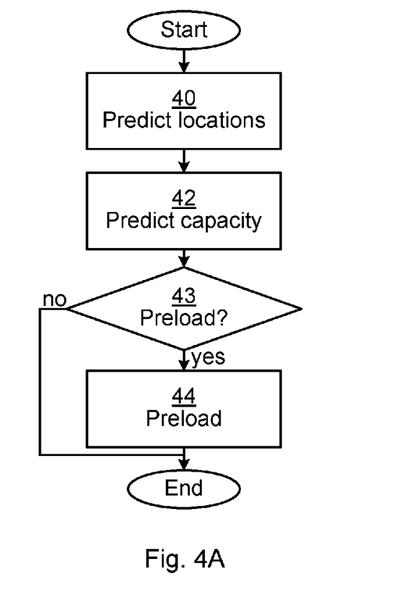
FIGS. 4A-B are flow charts illustrating embodiments of methods performed in a data provider device for providing data to the wireless device of FIG. 1.
Figure 4B:
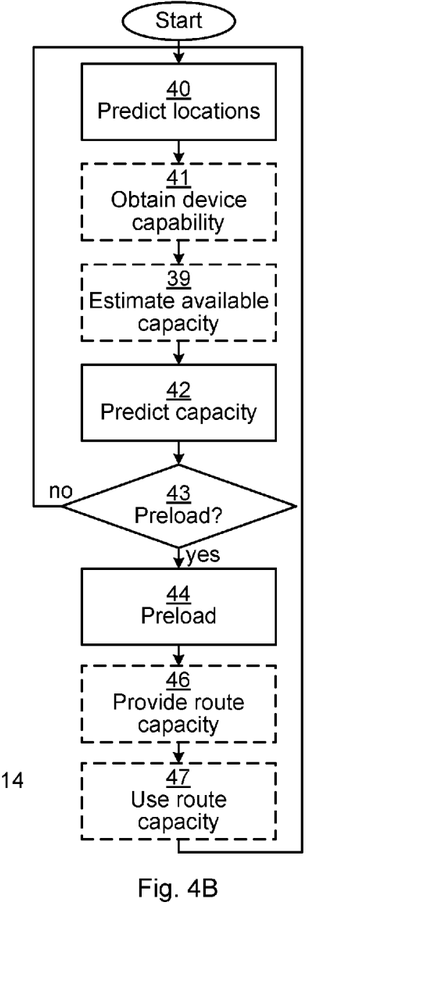

FIGS. 4A-B are flow charts illustrating methods performed in a data provider device (see FIGS. 7 and 8A-C below). First, the method illustrated in the flow chart of FIG. 4A will be described.

In a predict location step 40, a set of potential future locations of the wireless device is predicted. This step optionally comprises predicting a corresponding time for each one of the future locations in the set of potential future locations. The time can be a single time, e.g. of a predicted time of entry to a cell or a location in the set of potential future locations, or a time interval defining a time during which the wireless device is expected to be within the range of the location (e.g. cell) in the set of potential future locations.

Optionally, this step comprises assigning a probability of future presence of the wireless device at each one of the future locations. Hence, there can be several potential future locations for the same future time but with different probabilities. As time progresses, the probabilities are recalculated and the actual locations can turn into history records.

Optionally, the prediction of potential future locations is based on location data of the wireless device. For example, the location data may comprise a route of a navigation application of the wireless device. Alternatively or additionally, the location data contains a current location and/or speed of the wireless device, e.g. from a GPS (Global Positioning System) receiver in the wireless device or using an identifier of the current cell of the wireless device, also known as cell id.

The location of the wireless device can be stored for the past, present and future. Optionally, this can be stored in a location recording node in the network and can be introduced as an additional node in the 3GPP architecture. The location of the wireless device (e.g. longitude and latitude or cell ID) can be recorded together with a timestamp. An intention to move in particular direction in the future can also be recorded with a timestamp of when this was recorded and/or a timestamp of when the movement is predicted.

Optionally, the prediction of potential future locations is based on manual input received from a user of the wireless device. Alternatively or additionally, data such as a train or a bus tickets in the wireless device can be used to predict the set of potential future locations.

Any use of user data from the wireless device can be subject to user consent.

Figure 5:
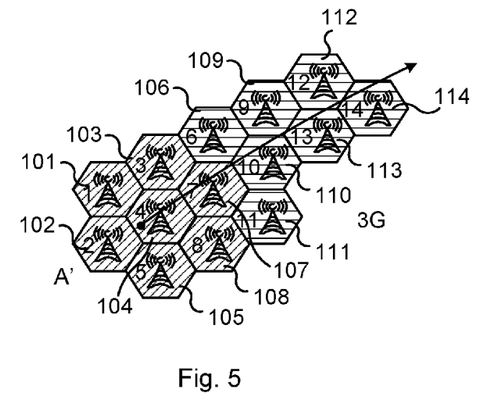
FIG. 5 illustrates a likely path of a wireless device of FIG. 1 through cells of a wireless network.

For example, the path 20 of FIG. 2 shows an example of a predicted set of potential future locations. Each potential future location can e.g. be a cell identifier and/or a coordinate e.g. comprising a longitude and latitude. Another example is shown in FIG. 5 and explained in more detail below.

In a predict capacity step 42, future data transfer capacity at the set of potential future locations is predicted. This step optionally comprises determining expected data transfer capacity for each radio cell corresponding to a future location in the set of potential future locations. The prediction of capacity can e.g. use a network coverage map, e.g. as shown in FIG. 2 and explained above and below.

When a corresponding time for each one of the future locations was predicted in the predict location step 40, this step comprises determining expected data transfer capacity at the corresponding time for each radio cell corresponding to a future location in the set of potential future locations.

In a conditional preload step 43, it is determined whether to preload or not. This results in a positive determination when, at a first time, an expected transfer capacity is greater than a desired data transfer capacity and when a data transfer capacity at a second time after the first time is predicted to be less than a desired data transfer capacity. In other words, at the first time, there is a surplus of data transfer and at the second time there is a shortage. Since the first time is before, it then makes sense to preload data at the first time, such that e.g. content buffers don't run out before or around the second time.

Optionally, the determination is positive only when a future data transfer capacity for a location with a probability greater than a threshold probability is predicted to be less than the desired data transfer capacity.

In a preload step 44, data is preloaded to the wireless device. In one embodiment, the preloading occurs via a proxy server.

A situation can arise that the wireless device has a subscription which limits the download capacity at the first time, so that not sufficient data for an acceptable user experience can be preloaded to the wireless device, which may, for instance, cause a buffer for a video stream to run out. Optionally, the wireless device is allowed to temporarily exceed such a limitation, to improve the general user experience of the network. Alternatively or additionally, the user of the wireless device can be notified with an offer to increase the data capacity to allow such preloading to occur with better effect in the future.

The method illustrated in FIG. 4B is similar to the method illustrated in FIG. 4A and the steps of FIG. 4A will not be described again. FIG. 4B includes optional steps related to improving the predicted capacity and also to provide capacity predictions for navigation routes.

In an optional obtain device capability step 41, a device capability of the wireless device is obtained. The capability can e.g. comprise information regarding what standard (LTE, W-CDMA, GSM) and release of the standard is supported by the wireless device. Alternatively or additionally, the device capability includes processing power, available memory, content buffer size, etc. This device capability can e.g. be obtained from signalling from the wireless device or from capability data stored in the network.

In an optional estimate available capacity step 39, the available capacity is estimated at the corresponding time for each radio cell corresponding to a future location in the set of potential future locations.

When the device capability is available, the predict capacity step 42 is also based on the device capability.

When the estimate available capacity step 39 is executed, the predict capacity step is based on the result of the estimated capacity.

In an optional provide route capacity step 46, when navigation routes have been provided from the wireless device to the data provider device, this step comprises providing a predicted capacity set for each one of the plurality of route alternatives. Each predicted capacity set comprises predicted data transfer capacity at a set of potential future locations along the associated route. The predicted capacity can be obtained in the same way as described for the predict capacity step 42.

In an optional use route capacity step 47, when the data provider device is implemented in the wireless device, the route capacity can be an input to the selection of the navigation route. Such selection can occur automatically by the wireless device or the wireless device can present the different navigation routes with respective predicted capacity, e.g. as average capacity, minimum capacity, and/or maximum capacity, such that the user can make an informed decision.

The method can be continuous and iterative. In this case, the method returns to the predict locations step 40 if it is determined not to preload in the conditional preload step 43. Also in this case, the method returns to the predict locations step 40 after the use route capacity step 47, the provide route capacity step 46, the preload step 44, whichever one is the last one that is executed.

Here now follows a more detailed discussion of embodiments of the methods of FIGS. 4A-B.

Mobility data of the wireless device to be used in the predict locations step 40 can be obtained in a separate process running in the background of the data provider device. There can be different events that trigger this background process, i.e. time (every second, every minute, every hour, etc.), position changes of the wireless device, phone calls taking place in the network as recorded in a CDR (call data record) data base.

One source of the mobility data can be a small application running on the wireless device capable of periodically posting the current position of the wireless device to the data provider device. The same application can also be used for posting an intention of travel by capturing an indication to travel to a certain place, e.g. navigation data, tickets, etc.

In one embodiment, the route can be determined from the location of the wireless device coupled with data of what is located at the location. For example, the wireless device could be located at a particular train station and then starts to move at a particular time matching a train timetable (optionally also considering live feeds of actual timetables, i.e. delays), where the subsequent locations and velocities match characteristics of rail travel of a particular train. Then the data provider device then can determine, with high probability, that the user is on the particular train from city A to B, whereby the set future of potential future locations can be deduced from this data.

A new position of the wireless device is communicated to the data provider device (located in the network or the wireless device itself). This process is initiated by an event that signifies a change in the position of the wireless device. The new position can be used to calculate and update a probabilistic mobility matrix for the wireless device. An update implies current positions previously recorded for that particular wireless device that are marked as a past position, time has passed since that data was current. Table 1 is a simple example of probabilistic mobility matrix.

TABLE 1

Example of a probabilistic mobility matrix

|    | Cell 1 | Cell 2 | Cell 3 |
|----|--------|--------|--------|
| T0 | 100    | 0      | 0      |
| T1 | 50     | 50     | 0      |
| T2 | 100    | 0      | 0      |

Assuming that we are now in time moment T0 and a posting of a new position is received for time moment T1, then the current information for T1 may change to a different cell id assuming that wireless device has moved to a different cell.

In a similar way, the small application can communicate several updates to this system by taking into account a complete route (so a set of new positions) as they are recorded by the route planner. In this way a set of potential future locations is provided to the data provider device 10.

Looking now to a little more detailed example illustrated in Table 2, the probability matrix can be initialised with the wireless device's current position in a particular cell. In this example the wireless device is in Cell 1 at time T0. Since we don't have any more information about this wireless device, the remaining cells of the matrix are populated by assigning the value 0 to all other cells for time T0 (a property of the probability mobility matrix is that the sum of all values at any given row cannot be greater than 100, this property moreover implies that the value in each cell can either be a floating point or integer number from 0 to 100).

TABLE 2

Example of a probabilistic mobility matrix

|    | Cell 1 | Cell 2 | Cell 3 | Cell 4 |
|----|--------|--------|--------|--------|
| T0 | 100    | 0      | 0      | 0      |
| T1 | 99     | 0.3    | 0.3    | 0.3    |
| T2 | 98     | 0.6    | 0.6    | 0.6    |
| T3 | 97     | 1      | 1      | 1      |
| T4 | 96     | 1.3    | 1.3    | 1.3    |
| T5 | 95     | 1.6    | 1.6    | 1.6    |
| T6 | 94     | 2      | 2      | 2      |

In this example, the probability of a cell decreases with 1 over time, so the probability that the wireless device will be in cell 1 at time T1 is 99, at time T2 it is 98, etc. The probability that the wireless device will be in cell 2 at time moment T1 is 0.3 which is estimated by (100−99)/3. This formula can be generalized as:

$$\frac{100 - \text{sum of all columns known probability}}{\text{number of unknown probabilities}} \qquad (1)$$

This function evenly distributes the probability that a wireless device may be in another cell equally between all other cells.

A probability in a particular cell is considered as known if it has been just recently registered in the system (current/previous time moment) or if it has been registered for future moments based on wireless device's intention to travel in a particular area.

The example of Table 2 now evolves into what is shown in Table 3. Now the wireless device moves to cell 2 in time T1. In this case the probability for cell 2 in time T1 becomes 100. This means that all other cell ids around that are updated and get a value of 0 since at this point in time we know that the wireless device is in cell 2. The probability for cell 1 in time T2, which used to be 98, is now halved to 49. Probabilities for the other cells in time T2 are updated using the formula (1) so the remaining probabilities are equally shared among the other cells. Future times of cells that have probabilities originating from previous known positions receive new values by decrementing probabilities over time.

TABLE 3

Example of an evolved probabilistic mobility matrix

|    | Cell 1 | Cell 2 | Cell 3 | Cell 4 |
|----|--------|--------|--------|--------|
| T0 | 100    | 0      | 0      | 0      |
| T1 | 0      | 100    | 0      | 0      |
| T2 | 49     | 50     | 0.6    | 0.6    |

TABLE 3-continued

Example of an evolved probabilistic mobility matrix

|    | Cell 1 | Cell 2 | Cell 3 | Cell 4 |
|----|--------|--------|--------|--------|
| T3 | 48     | 49     | 1.5    | 1.5    |
| T4 | 47     | 48     | 1.3    | 1.3    |
| T5 | 46     | 47     | 1.6    | 1.6    |
| T6 | 45     | 46     | 2      | 2      |

Now, a prediction of potential future locations according to another scenario will be described in more detail, corresponding to step 40 above, with reference to FIG. 5. FIG. 5 illustrates a likely path of a wireless device through cells of a wireless network. In one embodiment, probabilities of locations are provided over time, which in one example can be a path of cell ids that the wireless device will most likely traverse. In this example, this results in a set of potential future locations being cells 104, 107, 110, 109, 113, 112, and 114.

The algorithm starts its process by going through a 2-dimensional probabilistic mobility matrix that contains the probabilistic mobility prediction, as shown in Table 4. This table comprises n rows that denote points in time that can be past, present and future and m columns that denote the cell ids. In the intersection between a row and a column, it is shown the probability that a wireless device is going to be in cell id m at point in time t. The cells marked in bold is the most probable cell (or cells if two or more cells share the highest probability) at any one time.

TABLE 4

Probabilistic mobility prediction

| Time | Cell | | | | | | | | | | | | | |
|------|-----|-----|-----|-----|-----|-----|-----|-----|-----|-----|-----|-----|-----|-----|
|      | 101 | 102 | 103 | 104 | 105 | 106 | 107 | 108 | 109 | 110 | 111 | 112 | 113 | 114 |
| T1   | 0   | 0   | 0   | 100 | 0 | 0 | 0 | 0 | 0 | 0 | 0 | 0 | 0 | 0 |
| T2   | 0   | 0   | 10  | 10  | 0   | 0   | 70 | 10 | 0 | 0 | 0 | 0 | 0 | 0 |
| T3   | 0   | 0   | 0   | 0   | 0   | 30  | 10  | 0   | 0   | 60 | 0 | 0 | 0 | 0 |
| T4   | 0   | 0   | 0   | 0   | 0   | 0   | 0   | 0   | 40 | 20 | 0 | 0 | 40 | 0 |
| T5   | 0   | 0   | 0   | 0   | 0   | 0   | 0   | 0   | 0   | 0   | 0 | 40 | 20 | 40 |

This data can be used to deduce a probabilistic mobility vector (PMV) that is a sequence of cell-ids that track the possible future trajectory of the wireless device in space and time, see Table 5. The probabilistic mobility vector is calculated by collecting the cell id that has the highest probability for each row until a certain threshold is reached, namely the amount of positions one needs to calculate ahead in time.

TABLE 5

Probabilistic mobility prediction

| Time | Cell | | | | | | | | | | | | | |
|------|-----|-----|-----|-----|-----|-----|-----|-----|-----|-----|-----|-----|-----|-----|
|      | 101 | 102 | 103 | 104 | 105 | 106 | 107 | 108 | 109 | 110 | 111 | 112 | 113 | 114 |
| T1   |     |     |     | 100 |  |  |  |  |  |  |  |  |  |  |
| T2   |     |     |     |     |     |     | 70 |  |  |  |  |  |  |  |
| T3   |     |     |     |     |     |     |     |     |     | 60 |  |  |  |  |
| T4   |     |     |     |     |     |     |     |     | 40 |  |  |  | 40 |  |
| T5   |     |     |     |     |     |     |     |     |     |     |  | 40 |  | 40 |

The probabilistic mobility vector provides the potential future locations that the wireless device will traverse. In order to determine a future data transfer capacity (see step 42 above) and the preloading of content, two other variables can be used: free cell capacity (FCC) and maximum capacity of the cell (optionally also considering capability of the wireless device as described above), which depend on the mobility vector determination of cell ID at time Tn.

Table 6 shows a prediction of free capacity in each cell of the network which can be predicted from current and historical data, e.g. based on the standardised reporting functions available in 3GPP. The free capacity is expressed as percentages here. The cells in bold correspond to the probabilistic mobility prediction of Table 5.

TABLE 6 cell capacity prediction

| Time | Cell | | | | | | | | | | | | | |
|------|-----|-----|-----|-----|-----|-----|-----|-----|-----|-----|-----|-----|-----|-----|
|      | 101 | 102 | 103 | 104 | 105 | 106 | 107 | 108 | 109 | 110 | 111 | 112 | 113 | 114 |
| T1 | 10 | 20 | 10 | 40 | 30 | 50 | 10 | 30 | 5 | 60 | 10 | 10 | 30 | 40 |
| T2 | 15 | 20 | 10 | 10 | 40 | 30 | 10 | 60 | 70 | 10 | 10 | 20 | 30 | 10 |
| T3 | 10 | 15 | 5 | 5 | 50 | 20 | 15 | 70 | 60 | 50 | 10 | 70 | 30 | 5 |
| T4 | 5 | 10 | 5 | 10 | 40 | 10 | 30 | 80 | 30 | 20 | 10 | 60 | 30 | 5 |
| T5 | 5 | 5 | 5 | 10 | 30 | 5 | 40 | 70 | 10 | 10 | 10 | 60 | 20 | 5 |

Table 7 shows the maximum capacity of each cell based on the radio network planning and reporting functions available in 3GPP. In this example, LTE cells have a capacity of 16 Mbit per second, while 3G cells have a capacity of 4 Mbit per second. In reality this can be a dynamic determination based on planning and network reporting. Again, the cells in bold correspond to the probabilistic mobility prediction of Table 5.

TABLE 7

Cell Bit-Rate

| Time | Cell | | | | | | | | | | | | | |
|------|-----|-----|-----|-----|-----|-----|-----|-----|-----|-----|-----|-----|-----|-----|
|      | 101 | 102 | 103 | 104 | 105 | 106 | 107 | 108 | 109 | 110 | 111 | 112 | 113 | 114 |
| T1 | 16 | 16 | 16 | 16 | 16 | 4 | 16 | 16 | 4 | 4 | 4 | 4 | 4 | 4 |
| T2 | 16 | 16 | 16 | 16 | 16 | 4 | 16 | 16 | 4 | 4 | 4 | 4 | 4 | 4 |
| T3 | 16 | 16 | 16 | 16 | 16 | 4 | 16 | 16 | 4 | 4 | 4 | 4 | 4 | 4 |
| T4 | 16 | 16 | 16 | 16 | 16 | 4 | 16 | 16 | 4 | 4 | 4 | 4 | 4 | 4 |
| T5 | 16 | 16 | 16 | 16 | 16 | 4 | 16 | 16 | 4 | 4 | 4 | 4 | 4 | 4 |

Given the mobility vector prediction, free cell capacity (FCC) and the maximum capacity, the expected transfer capacity can be calculated and preloading can be used to improve content delivery to the wireless device. For example, this can allow continuous viewing of streamed video content which would otherwise not be possible.

More specifically, it is determined when different content blocks should be preloaded to the wireless device based on the predicted future data transfer capacity. The scheduling of the cell where the actual content is downloaded to the UE is based on this prediction. For viewing of a content stream there is a point in time by which a certain content block needs to be downloaded to allow continuous viewing. This is a hard limit and no points in time should be scheduled after that time.

TABLE 8

Content Block Delivery Schedule

| Time | CB1 | | | CB2 | | | CB3 | | | CB4 | | | CB5 | | | CB6 | | |
|---|---|---|---|---|---|---|---|---|---|---|---|---|---|---|---|---|---|---|
| | P | F | M | P | F | M | P | F | M | P | F | M | P | F | M | P | F | M |
| T1 | 100 | 40 | 16 | | | | | | | | | | | | | | | |
| T2 | | | | 100 | 40 | 16 | 70 | 10 | 4 | | | | | | | | | |
| T3 | | | | | | | | | | 60 | 50 | 4 | | | | 40/40 | 60/5 | 4/4 |
| T4 | | | | | | | | | | | | | 40/40 | 30/30 | 4/4 | | | |
| T5 | | | | | | | | | | | | | | | | | | |

In the instantiation shown in Table 8, we see a simplified content delivery schedule based on the probabilistic mobility vector (P) and network capabilities in terms of free cell capacity (F) and maximum capacity (M). Note that time increases vertically as with Tables 4 to 7, but in contrast to Tables 4 to 7, content blocks are here represented horizontally. Hence, the content block (CB) size maps to the time interval T. In order to start streaming the content quickly, CB1 should be delivered in time T1. Thereafter, CB2 can be delivered at T2 as the network has enough capacity and bandwidth, however CB3 will be preloaded also in time T2 (corresponding to the first time in the conditional preload step 43 above) due to the lower free capacity (10%) and lesser bandwidth predicted for T3, in (corresponding to the second time in the conditional preload step 43 above). Given this instantiation, CB4 and CB5 can be scheduled in the preceding time interval to actual consumption. However the unreliability of the variables for CB6 and the possibility of extremely low free capacity, leads to the CB6 content being preloaded at time T3 to ensure that it is available for consumption in time T6. The handling of CB3 and CB6 gives an indication of how preloading mitigates the effect of reduced network capability or service holes to maintain seamless user experience.

Once the download is scheduled, this scheduling is communicated to the wireless device. The wireless device can be asked to report if it has reached the scheduled cell. The scheduler will also re-calculate the scheduling regularly to see if the original prediction is still correct. If it comes to a different result, a new schedule is deduced and communicated.

As an improvement to the described scheduling method the probabilities of the wireless device location can be used to weight the free capacity value. This reflects that the location becomes more uncertain far in the future, leading to lower probability values further in the future in the location prediction vector. This means that high free capacities would be weighted lower the further ahead in the future they are, triggering more preloading to cope with the uncertainty.

Figure 6:
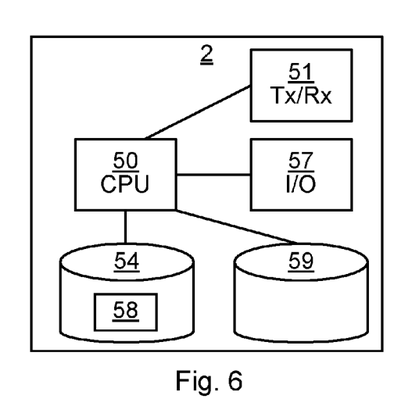
FIG. 6 is a schematic diagram showing some components of the wireless device of FIG. 1.

FIG. 6 is a schematic diagram showing some components of the wireless device 2 of FIG. 1. A processor 50 is provided using any combination of one or more of a suitable central processing unit (CPU), multiprocessor, microcontroller, digital signal processor (DSP), application specific integrated circuit etc., capable of executing software instructions 58 stored in a memory 54, which can thus be a computer program product.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 59 is also provided for reading and/or storing data during execution of software instructions in the processor 50. The data memory 59 can be any combination of read and write memory (RAM) and read only memory (ROM).

The wireless device 2 further comprises an I/O interface 57 for communicating with other external entities. The I/O interface 57 also includes a user interface including one or more of a display (optionally touch sensitive), keys, microphone, speaker, etc.

The wireless device 2 also comprises one or more transceivers 51, comprising analogue and digital components, and a suitable number of antennas (not shown) for wireless communication with network nodes as shown in FIG. 1.

Other components of the wireless device 2 are omitted in order not to obscure the concepts presented herein.

Figure 7:
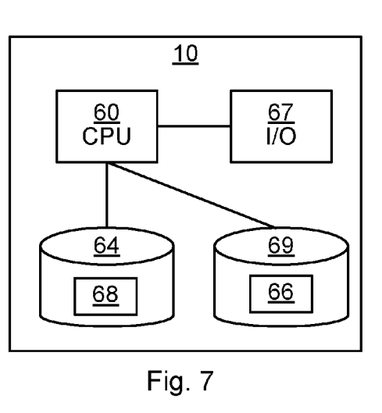
FIG. 7 is a schematic diagram showing some components of the data provider device of FIG. 1.

FIG. 7 is a schematic diagram showing some components of the data provider device 10 arranged to execute any one or more of the methods of FIGS. 4A-B. The components shown here can be components used from a host device containing the data provider device 10, and/or components for the data provider device 10, separate from the host device. A processor 60 is provided using any combination of one or more of a suitable central processing unit (CPU), multiprocessor, microcontroller, digital signal processor (DSP), application specific integrated circuit etc., capable of executing software instructions contained in a computer program 68 stored in a computer program 64, e.g. in the form of a memory, which can thus be a computer program product. The processor 60 can be configured to execute the method described with reference to FIGS. 4A-B above.

The computer program 68 may comprise instructions that, when executed by the processor, causes the data provider device 10 to: predict a set of potential future locations of a wireless device of the cellular communication network; predict future data transfer capacity at the set of potential future locations; and preload data to the wireless device at a first time when an expected transfer capacity is greater than a desired data transfer capacity, and when a data transfer capacity at a second time after the first time is predicted to be less than a desired data transfer capacity.

The instructions to predict future data transfer capacity may comprise instructions that, when executed by the processor, causes the data provider device 10 to determine expected data transfer capacity for each radio cell corresponding to a future location in the set of potential future locations.

The instructions to predict a set of potential future locations may comprise instructions that, when executed by the processor, causes the data provider device 10 to predict a corresponding time for each one of the future locations in the set of potential future locations. In such a case, the instructions to predict future data transfer capacity comprise instructions that, when executed by the processor, causes the data provider device 10 to determine expected data transfer capacity at the corresponding time for each radio cell corresponding to a future location in the set of potential future locations.

The computer program 68 may further comprise instructions that, when executed by the processor, causes the data provider device 10 to estimate available capacity at the corresponding time for each radio cell corresponding to a future location in the set of potential future locations. In such a case, the instructions to predict future data transfer capacity comprise instructions that, when executed by the processor, causes the data provider device 10 to predict future data transfer capacity based on the result of the estimating available capacity.

The instructions to predict a set of potential future locations may comprise instructions that, when executed by the processor, causes the data provider device 10 to assign a probability of future presence at each one of the future locations.

The instructions to preload data may comprise instructions that, when executed by the processor, causes the data provider device 10 to preload data only when a future data transfer capacity for a location with a probability greater than a threshold probability is predicted to be less than the desired data transfer capacity.

The computer program 68 may further comprise instructions that, when executed by the processor, causes the data provider device 10 to: obtain a device capability of the wireless device. In such a case, the instructions to predict future data transfer capacity comprise instructions that, when executed by the processor, causes the data provider device 10 to predict future data transfer capacity based on the device capability.

The instructions to predict a set of potential future locations may comprise instructions that, when executed by the processor, causes the data provider device 10 to predict a set of potential future locations based on location data from the wireless device.

The location data may comprise a route of a navigation application of the wireless device.

The location data may comprise a plurality of route alternatives, in which case the computer program 68 further comprises instructions that, when executed by the processor, causes the data provider device 10 to provide a predicted capacity set for each one of the plurality of route alternatives, each predicted capacity set comprising predicted data transfer capacity at a set of potential future locations along the associated route.

The instructions to predict a set of potential future locations may comprise instructions that, when executed by the processor, causes the data provider device 10 to predict a set of potential future locations based on manual input received from a user of the wireless device.

The computer program product-is here a memory being any combination of read-and-write memory (RAM) and read-only memory (ROM). The memory also comprises persistent storage, which, for example, can be any single one or combination of magnetic memory, optical memory, solid state memory or even remotely mounted memory. The processor 60 controls the general operation of the data provider device 10.

The data provider device 10 further comprises a data memory 69, which is a read-and-write memory. The data memory 69 may also comprise persistent storage, which, for example, can be any single one or combination of magnetic memory, optical memory, solid state memory or even remotely mounted memory. The data memory 69 can e.g. store data 66 comprising e.g. the set of potential future locations, future data transfer capacity, and/or the device capability. Optionally, the computer program product 64 and the data memory 69 can form part of the same memory device.

The data provider device 10 further comprises an I/O interface 67 for communicating with external entities, e.g. to communicate with a wireless device to obtain device capability and/or provide capacity along one or more routes. Other components of the data provider device 10 are omitted in order not to obscure the concepts presented herein.

Figure 8A:
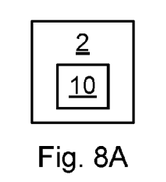
FIGS. 8A-C are schematic diagrams illustrating various locations where the data provider device of FIG. 7 can be implemented.
Figure 8B:
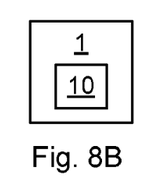
Figure 8C:
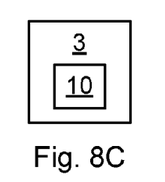

FIGS. 8A-C are schematic diagrams illustrating various locations where the data provider device of FIG. 7 can be implemented. The data provider device 10 provides data to a wireless device. The data provider device 10 can be located in, or in conjunction to, any suitable host device anywhere in the cellular network (see 8 of FIG. 1).

In FIG. 8A, an embodiment is shown where the data provider device 10 is located in the wireless device 2. This simplifies signalling between the wireless device and the data provider device since these are co-located.

In FIG. 8B, an embodiment is shown where the data provider device 10 is located in the network node 1. The network node has more processing power than the wireless device. Furthermore, the network node is not powered by a battery, as typically is the case for wireless devices, so extra processing in the network node does not increase battery usage in the wireless device.

In FIG. 8C, an embodiment is shown where the data provider device 10 is located in the core network 3, in a new node in the core network 3 or in an existing node, such as in or by an SGSN (Serving GPRS (General Packet Radio Service) Support Node), a GGSN (Gateway GPRS Support Node), a Serving Gateway, or a Packet Data Network Gateway. The core network may also have central information regarding network coverage map, capability information etc., which simplifies communication regarding this data for the data provider device 10.

Optionally, different data provider devices 10 or different parts of the data provider device 10 can be housed in multiple host devices, e.g. as many different host devices of the core network 3. For example, there can be one node used for prediction and another node used for preloading.

Figure 9:
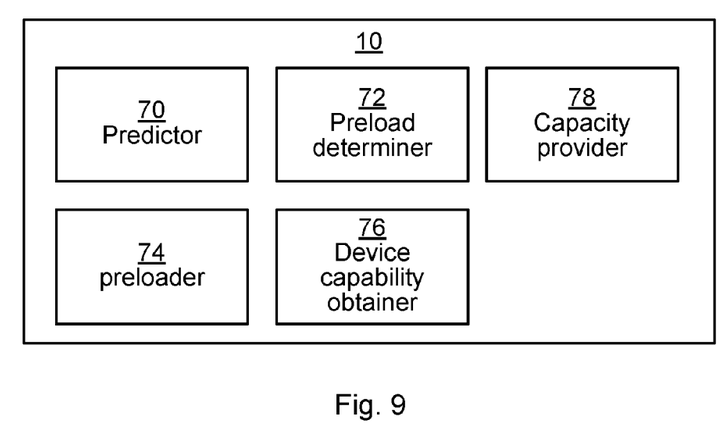
FIG. 9 is a schematic diagram showing functional modules of the data provider device of FIGS. 1 and 7.

FIG. 9 is a schematic diagram showing functional modules of the data provider device 10 FIG. 7. The modules can be implemented using software instructions such as a computer program executing in the network node 1 and/or using hardware, such as application specific integrated circuits, field programmable gate arrays, discrete logical components, etc. The modules correspond to the steps in the methods illustrated in FIGS. 4A-B.

A predictor 70 is arranged to predict a set of potential future locations of the wireless device and to predict future data transfer capacity at the set of potential future locations. This module corresponds to the predict locations step 40 and the predict capacity step 42 of FIGS. 4A-B.

Optionally, the predictor 70 is arranged to determine expected data transfer capacity for each radio cell corresponding to a future location in the set of potential future locations.

In one embodiment, the predictor 70 is arranged to predict a corresponding time for each one of the future locations in the set of potential future locations, and to determine expected data transfer capacity at the corresponding time for each radio cell corresponding to a future location in the set of potential future locations.

In one embodiment, the predictor 70 is arranged to estimate available capacity at the corresponding time for each radio cell corresponding to a future location in the set of potential future locations, in which case future data transfer capacity is predicted based on the result of the estimating available capacity.

In one embodiment, the predictor 70 is arranged to assign a probability of future presence at each one of the future locations.

When a device capability is provider from the device capability obtainer 76, the predictor 70 is arranged to predict future data transfer capacity based on the device capability.

In one embodiment, the predictor 70 is arranged to predict a set of potential future locations based on location data from the wireless device, e.g. comprising a route of a navigation application of the wireless device.

In one embodiment, the predictor 70 is arranged to predict a set of potential future locations based on manual input received from a user of the wireless device.

A preload determiner 72 is arranged to determine when preloading is to occur. This module corresponds to the conditional preload step 43 of FIGS. 4A-B.

In one embodiment, the preload determiner 72 is arranged to preload data only when a future data transfer capacity for a location with a probability greater than a threshold probability is predicted to be less than the desired data transfer capacity.

A preloader 74 is arranged to perform the preloading of data to the wireless device. This module corresponds to the preload step 44 of FIGS. 4A-B.

A device capability obtainer 76 is arranged to obtain device capability of the wireless device. This module corresponds to the obtain device capability step 41 of FIG. 4B.

A capacity provider 78 is arranged to provide a predicted capacity set for each one of a plurality of route alternatives, where each predicted capacity set comprises predicted data transfer capacity at a set of potential future locations along the associated route. This module corresponds to the provide route capacity step 46 of FIG. 4B.

Figure 10:
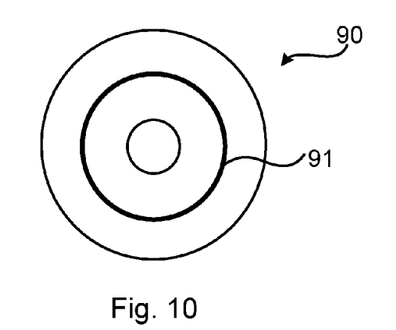
FIG. 10 shows one example of a computer program product comprising computer readable means.

FIG. 10 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7. While the computer program 91 is here schematically shown as a track on the depicted optical disk, the computer program can be stored in any way which is suitable for the computer program product, such as a removable solid state memory.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for providing data to a wireless device in a cellular communication network comprising a plurality of radio cells, the method being performed by a data provider device and comprising the steps of:
    determining an expected data transfer capacity that is expected to be available during a first time;
    determining a set of potential future locations of the wireless device, said set of potential future locations comprising a first potential future location;
    determining a probability that the wireless device will be located at the first potential future location at a second time that is after the first time;
    determining that the determined probability is greater than a predetermined probability threshold;
    predicting a future data transfer capacity for the first potential future location during the second time;
    determining that the expected data transfer capacity is greater than a first desired data transfer capacity;
    determining that the predicted future data transfer capacity is less than a second desired data transfer capacity;
    as a result determining that i) the expected data transfer capacity is greater than the first desired data transfer capacity, ii) the predicted future data transfer capacity is less than the second desired data transfer capacity, and iii) the determined probability that the wireless device will be located at the first potential future location at the second time is greater than the predetermined probability threshold, preloading data to the wireless device during the first time.

2. The method of claim 1, wherein the step of predicting future data transfer capacity comprises determining expected data transfer capacity for each radio cell corresponding to a future location in the set of potential future locations.

3. The method of claim 2, wherein:
    the step of predicting a set of potential future locations comprises predicting a corresponding time for each one of the future locations in the set of potential future locations; and
    the step of predicting future data transfer capacity comprises determining expected data transfer capacity at the corresponding time for each radio cell corresponding to a future location in the set of potential future locations.

4. The method of claim 3, further comprising the step of estimating available capacity at the corresponding time for each radio cell corresponding to a future location in the set of potential future locations; and wherein the step of predicting future data transfer capacity is based on the result of the estimating available capacity.

5. The method of claim 1, further comprising the step of:
    obtaining a device capability of the wireless device; and
    wherein the step of predicting future data transfer capacity is based on the device capability.

6. The method of claim 1, wherein the step of predicting a set of potential future locations is based on location data of the wireless device.

7. The method of claim 6, wherein the location data comprises a route of a navigation application of the wireless device.

8. The method of claim 7, wherein the location data comprises a plurality of route alternatives and the method further comprises the step of:
    providing a predicted capacity set for each one of the plurality of route alternatives, each predicted capacity set comprising predicted data transfer capacity at a set of potential future locations along the associated route.

9. The method of claim 1, wherein the step of predicting a set of potential future locations is based on manual input received from a user of the wireless device.

10. A data provider device arranged to be part of a cellular communication network comprising a plurality of radio cells, the data provider device comprising:
a processor; and
a memory storing instructions that, when executed by the processor, causes the data provider device to:
determine an expected data transfer capacity that is expected to be available during a first time;
determine a set of potential future locations of a wireless device of the cellular communication network, said set of potential future locations comprising a first potential future location;
determine a probability that the wireless device will be located at the first potential future location at a second time that is after the first time;
determine that the determined probability is greater than a predetermined probability threshold;
predict a future data transfer capacity for the first potential future location during the second time;
determine that the expected data transfer capacity is greater than a first desired data transfer capacity;
determine that the predicted future data transfer capacity is less than a second desired data transfer capacity;
as a result of determining that i) the expected data transfer capacity is greater than the first desired data transfer capacity, ii) the predicted future data transfer capacity is less than the second desired data transfer capacity, and iii) the determined probability that the wireless device will be located at the first potential future location at the second time is greater than the predetermined probability threshold, preload data to the wireless device during the first time.

11. The data provider device of claim 10, wherein the instructions to predict future data transfer capacity comprise instructions that, when executed by the processor, causes the data provider device to determine expected data transfer capacity for each radio cell corresponding to a future location in the set of potential future locations.

12. The data provider device of claim 11, wherein:
the instructions to predict a set of potential future locations comprise instructions that, when executed by the processor, causes the data provider device to predict a corresponding time for each one of the future locations in the set of potential future locations; and
the instructions to predict future data transfer capacity comprise instructions that, when executed by the processor, causes the data provider device to determine expected data transfer capacity at the corresponding time for each radio cell corresponding to a future location in the set of potential future locations.

13. The data provider device of claim 12, further comprising instructions that, when executed by the processor, causes the data provider device to estimate available capacity at the corresponding time for each radio cell corresponding to a future location in the set of potential future locations; and wherein the instructions to predict future data transfer capacity comprise instructions that, when executed by the processor, causes the data provider device to predict future data transfer capacity based on the result of the estimating available capacity.

14. The data provider device of claim 10, further comprising instructions that, when executed by the processor, causes the data provider device to:
obtain a device capability of the wireless device; and
wherein the instructions to predict future data transfer capacity comprises instructions that, when executed by the processor, causes the data provider device to predict future data transfer capacity based on the device capability.

15. The data provider device of claim 10, wherein the instructions to predict a set of potential future locations comprise instructions that, when executed by the processor, causes the data provider device to predict a set of potential future locations based on location data from the wireless device.

16. The data provider device of claim 15, wherein the location data comprises a route of a navigation application of the wireless device.

17. The data provider device of claim 16, wherein the location data comprises a plurality of route alternatives and the data provider further comprise instructions that, when executed by the processor, causes the data provider device to: provide a predicted capacity set for each one of the plurality of route alternatives, each predicted capacity set comprising predicted data transfer capacity at a set of potential future locations along the associated route.

18. The data provider device of claim 10, wherein the instructions to predict a set of potential future locations comprise instructions that, when executed by the processor, causes the data provider device to predict a set of potential future locations based on manual input received from a user of the wireless device.

19. A network node comprising the data provider device of claim 10.

20. A wireless device comprising the data provider device of claim 10.

21. A computer program product comprising a non-transitory computer readable medium storing a computer program for providing data to a wireless device in a cellular communication network comprising a plurality of radio cells, the computer program comprising computer program code which, when run on a data provider device causes the network node to:
determine an expected data transfer capacity that is expected to be available during a first time;
determine a set of potential future locations of a wireless device of the cellular communication network, said set of potential future locations comprising a first potential future location;
determine a probability that the wireless device will be located at the first potential future location at a second time that is after the first time;
determine that the determined probability is greater than a predetermined probability threshold;
predict a future data transfer capacity for the first potential future location during the second time;
determine that the expected data transfer capacity is greater than a first desired data transfer capacity;
determine that the predicted future data transfer capacity is less than a second desired data transfer capacity;
as a result of determining that i) the expected transfer capacity is greater than the first desired data transfer capacity, ii) the predicted future data transfer capacity is less than the second desired data transfer capacity, and iii) the determined probability that the wireless device will be located at the first potential future location at the second time is greater than the predetermined probability threshold, preload data to the wireless device during the first time.

22. A method for preloading content on a wireless device, comprising:

determining an expected block of data that is expected to be transmitted to the wireless device during a certain future period of time;

determining a current amount of data transfer capacity that is currently available for transmitting to the wireless device said expected block of data;

determining an expected amount of data transfer capacity that is expected to be available during said future period of time for transmitting said expected block of data to the wireless device, wherein determining the expected amount of data transfer capacity comprises predicting the wireless device's location during the future period of time and determining an expected amount of data transfer capacity that is expected to be available at the predicted location during said future period of time;

determining a probability of future presence of the wireless device at the predicted location;

determining that the probability of the future presence of the wireless device at the predicted location is greater than a probability threshold;

determining whether the determined current amount of data transfer capacity meets or exceeds a first threshold;

determining whether the expected amount of data transfer capacity that is expected to be available during said future period of time is less than a second threshold; and as a result of determining that a) the determined current amount of data transfer capacity meets or exceeds the first threshold and b) the determined expected amount of data transfer capacity is less than the second threshold, using at least some of the currently available data transfer capacity to transmit to the wireless device the expected block of data prior to the future period of time.

* * * * *